Oct. 26, 1971   J. ROPER   3,614,833
PORTABLE MACHINE FOR CUTTING MATERIALS
Filed June 9, 1970   3 Sheets-Sheet 3

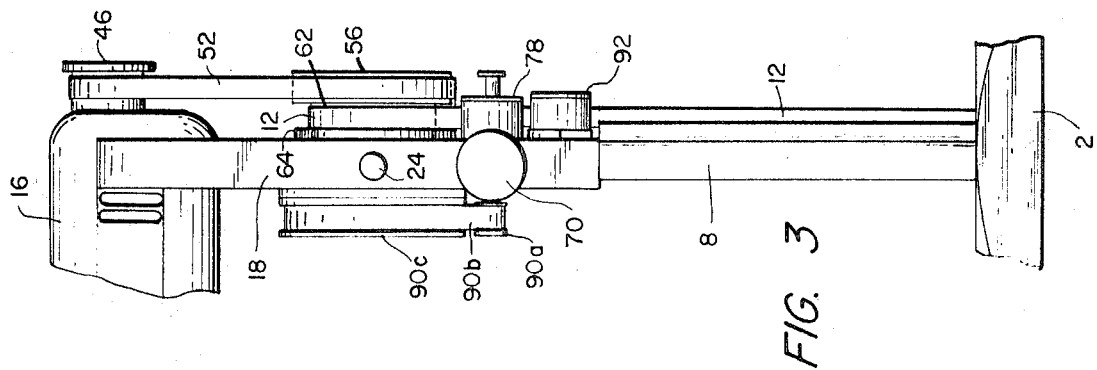
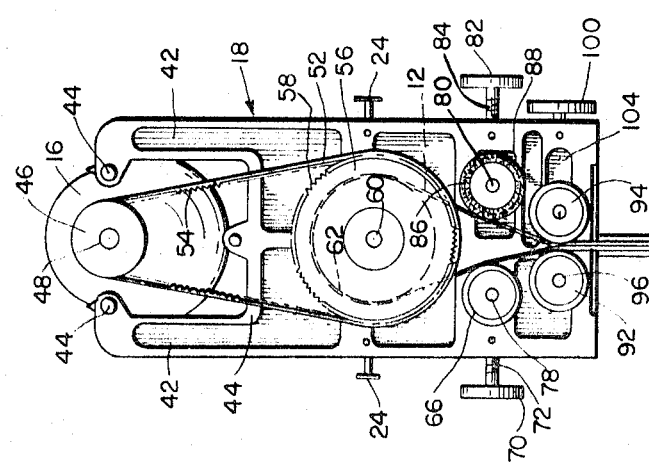
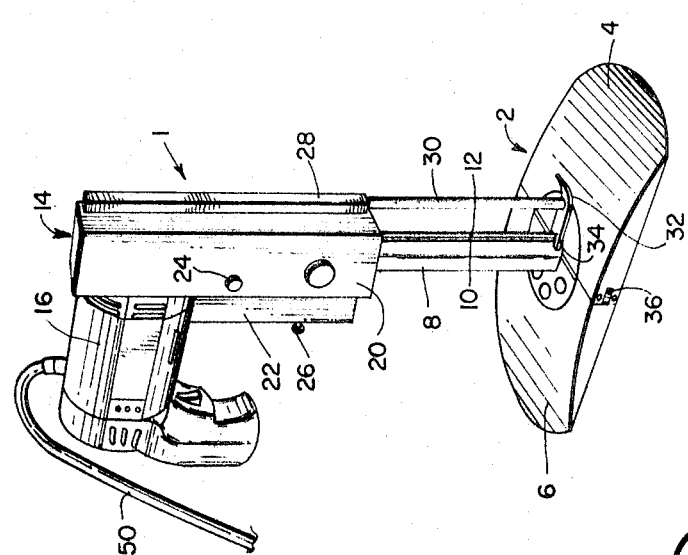
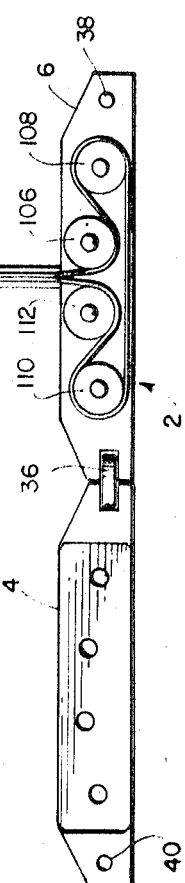

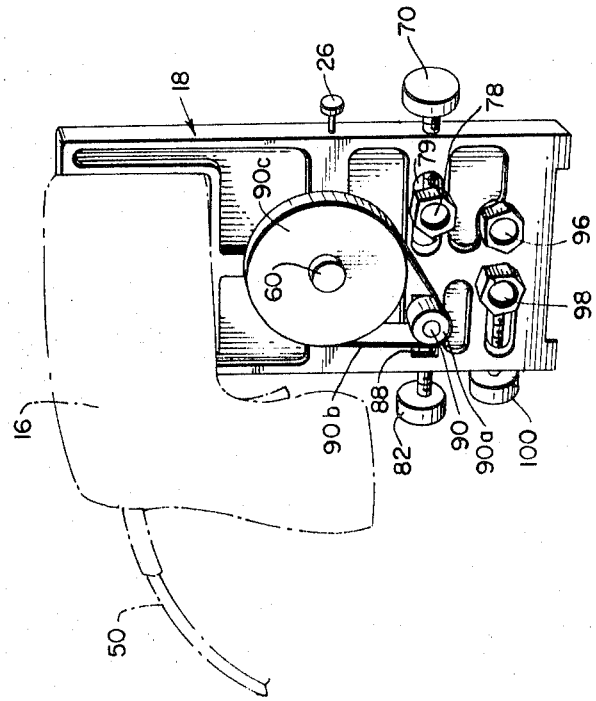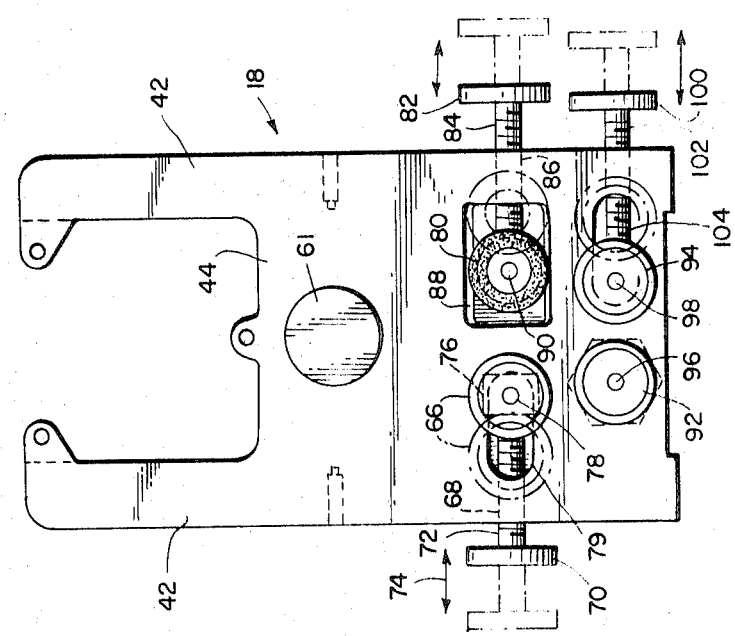

INVENTOR
JOHN ROPER

BY Arthur Schwartz

ATTORNEYS

United States Patent Office 3,614,833
Patented Oct. 26, 1971

3,614,833
PORTABLE MACHINE FOR CUTTING MATERIALS
John Roper, Baltimore, Md., assignor to Inventions
Development Corporation, Baltimore, Md.
Filed June 9, 1970, Ser. No. 44,697
Int. Cl. B26b 27/00
U.S. Cl. 30—139                                    14 Claims

ABSTRACT OF THE DISCLOSURE

A portable band shear machine for cutting cloth, rugs, plastic and the like having an endless band blade with means for continuously sharpening same.

BACKGROUND AND OBJECTS

The instant invention relates to a readily portable machine for cutting cloth, rugs, plastic sheet material, and the like, to a particular pattern or shape.

The material to be cut is laid on a table top in an orderly pile and the pattern is placed relative thereto. Prior cutting devices have necessitated the use of large, heavy machinery and then positioning the material relative to the machine. It is proposed that in the instant invention the machine may be said to be brought to the material rather than the material brought to the machine.

One prior art approach to cutting sheet material has been the provision of a multiplicity of cutting blades incorporated in a hand-held machine. However, this type of device is expensive to build and operate, whereas, the instant invention provides a simple, lightweight cutting tool.

Another prior art approach to material cutting machines having an endless band includes a large complex stationary machine which requires two pulleys to turn the endless band blade. It is necessary in this type of device to have rotatably mounted brackets with pulleys thereon which rotate in unison. These two spaced pulleys are used to maintain the blade taut. The instant invention proposes as an object to greatly simplify the cutting machine and the means for driving the blade.

Many of the other prior art endless cutting blades required saw teeth thereon to facilitate the cutting action. The instant invention contemplates the use of rustless razor blade stock which obviously does not require the use of saw teeth.

A considerable number of prior art cloth cutters have included a reciprocating blade having a relatively small horsepower motor driving the reciprocating blade from above. Many have even had handles for moving or guiding the machine relative to the cloth or other material to be cut. However, in reality these machines have been so heavy that it was extremely difficult for workers, and particularly women, to move or manipulate the cutter. Some have been in the range of 50 to 75 pounds. This has been found to be extremely fatiguing on the operator. The instant invention contemplates a device weighing in the area of 11 to 15 pounds.

Another object of the invention is to provide a cutting device which will be powered by a DC voltage source. This has two purposes. First of all, by providing a rechargeable battery pack in a conventional DC drill-type motor device, the cutter can be extremely portable and will not need to be close to a source of electricity, i.e. an electric outlet. More importantly, the use of a direct current drive means eliminates the problem that is created with AC powered motors wherein lint is attracted to the motor itself. By using a direct current motor the static generated by the metal belt charges the lint so that it will be attracted to ground rather than to the motor itself.

Another object is to provide a sharpening device for the cutter which is both adjustable and also continually operating off of the drive motor.

SUMMARY OF THE INVENTION

The motor driven portable material cutter of the instant invention has a metal endless band held by rollers in such a manner that the two sides of the belt form a band shear in a vertical line extending between a drive source and a plurality of return rollers. Means is provided to sharpen the blade and to obtain access to the interior of the return rollers for purposes of positioning the blade thereon.

BRIEF DESCRIPTION OF THE DRAWINGS

While several objects of the invention have been pointed out, other objects will become more apparent by reference to the following description, taken in conjunction with the drawings forming a part thereof, wherein:

FIG. 1 is a perspective view of the side and front of the cutting device seen with the covers in place;

FIG. 2 is a front elevation view of the device of FIG. 1 seen with the covers removed and the front portion of the base pivoted open;

FIG. 3 is a side elevation view of FIG. 2;

FIG. 4 is a detail view of the mounting bracket;

FIG. 5 is a rear perspective view of the cutter with the rear cover removed;

Figure 6:
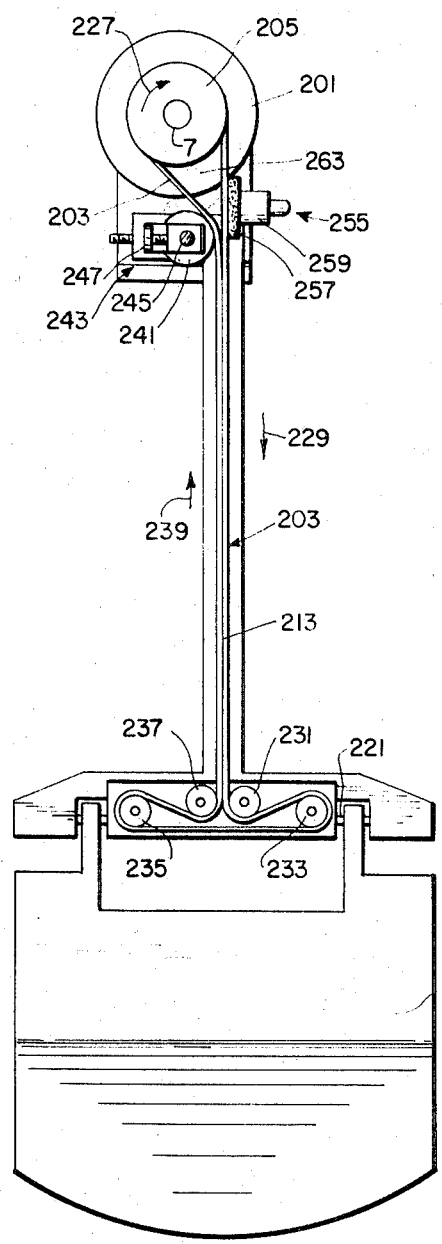
FIG. 6 is a front elevation view of the invention wherein a portion of the base plate is hinged downwardly to provide access to the return rollers.

Detailed description of the embodiment of FIGS. 1–5

Referring now to FIGS. 1–5, a cutter according to the invention is seen at 1. The cutter includes a base 2 having a leading wedge-type element 4 and a trailing wedge 6. Mounted on the base 2 is a support 8 having a groove 10 and a blade 12 protruding therefrom. An upper end portion of the device is seen broadly at 14 having an electric drill-type motor 16 positioned thereon. The upper portion 14 consists of a mounting bracket 18 seen in FIGS. 2 and 4.

A front cover 20 is shown in FIG. 1, together with a rear cover 22. The front cover 20 is held in place by means of a pair of thumb screws 24, while the rear cover 22 is held in place by a thumb screw 26.

On the front of cover 20 is a channel-shaped member 28, the covers and channel members preferably being made of lightweight plastic. Within the channel 28 is positioned a shaft 30 connected to a presser foot 32 which is bifurcated adjacent the support and blade and having a pair of arms 34.

The base 2 as best seen in FIG. 2 has its forward or leading wedge 4 pivotally opened by means of a hinge 36 relative to the trailing wedge portion 6. A pin 38 frictionally locks the two portions together by engaging a hole 40.

The mounting bracket 18 has a pair of upstanding arms 42 which form a U-shaped opening with a bight portion 44. A pair of screws or other fastening means 44 are used to connect the mounting bracket and the drill motor or other driving means 16. The drive may be any small portable motor, for example, a standard drill motor having a friction pulley 46 in lieu of the drill chuck. The pulley 46 is connected to the motor 16 by means of a drive shaft 48. An electric cord is seen at 50 in FIG. 1. The motive power may be either AC or DC. It has been found that when cutting various types of cloth and plastic, the alternating current unit will collect lint, while a DC type motor will not. The reason for this is that the alternating current device is grounded and the metal blade 12 generates a static charge, thus driving the lint to the grounded electrode. On the other hand, when a DC battery powered motor is utilized, the lint is repelled and searches for a grounded electrode. The reasoning behind this is obvious from the field of electrostatic precipitation.

The friction pulley 46 has a first drive belt 52 thereon which may have a saw tooth arrangement 54. The belt extends around another pulley 56 having comparable teeth 58.

The pulley 56 is mounted on a pulley shaft 60 in a journaled opening 61 which also includes a drive roller 62 carrying the endless band blade 12. It will be noted from FIG. 3 that the drive roller 62 has a rear flange 64 thereon. This back or rear flange is designed to keep the endless band blade 12 from moving backwards under a thrust load. Therefore, other means are not needed to restrict this backward movement under such loads.

On the lower portion of the mounting bracket is positioned an adjustable tension roller 66 which may be seen in FIG. 4 as well as FIG. 2. The mounting bracket has a hole or opening 68 which has threaded therein an adjusting thumb screw 70 with a threaded shaft 72 movable inwardly and outwardly as illustrated by the arrow 74. The shaft 72 is connected to a member 76 having a shaft 78 to which the tension roller 66 is secured. The entire element is movable within a slotted area 79 to provide for the adjustment.

Opposite the adjustable tension roller 66 is a beveled adjustable grinder of sharpening wheel 80 which is likewise moved inwardly and outwardly by means of a thumb screw 82 and a threaded shaft 84 in an opening 86. The grinder 80 is adjusted in a manner similar to that discussed above in an opening 88.

The grinder wheel is rotated on a shaft 90 connected to a grinder drive pulley 90a as seen in a rear view in FIG. 5. A drive belt 90b connects the grinder drive pulley 90a to a larger pulley 90c mounted on shaft 60 which operates in unison with pulley 56.

The grinder or sharpening wheel 80 is moved inwardly to provide an initial sharpening action on the blade 12. It is then moved outwardly so that a fine, continuous sharpening action takes place on the blade. As the blade wears and needs additional sharpening, the thumb screw 82 can be moved inwardly again to better hone the blade.

Below the adjustable tension roller 66 and the grinding wheel 80 is positioned two additional idler rollers 92 and 94. Roller 92 is fixedly rotated on a shaft 96 while roller 94 is rotated on a shaft 98, having a thumb screw 100 connected thereto by a shaft 102, all operating in a manner similar to the roller 66 and wheel 80. This also has a slot 104 functioning as discussed above.

Each of the rollers 66, 92 and 94 may be provided with rear flanges similar to element 64 discussed in relation to the larger drive roller 62. This will also provide the restraint against backward movement during thrust loads.

The pulley 56 and drive pulley roller 62 will rotate, for example, in a clockwise direction as viewed in FIG. 2, and the band 12 will move downwardly over the grinding wheel 80. It will then move around a first guide roller 106, a first return roller 108, a second return roller 110 and a second guide roller 112. As it moves upwardly, it passes over the fixed lower idler roller 92, over the adjustable tension roller 66 and back around the pulley connected drive roller 62. The rollers 106–112 also have rear flanges for restraint purposes.

The blade 12 is made of rustless razor blade stock which may be, for example, SAE 1085 razor blade quality steel. The thickness is between 0.003 inch and 0.005 inch, the preferred thickness being 0.003 inch, and its thickness relative to the rolls 106 and 112 of the band depends upon the flexing moment of the band. For example, a 0.003 inch thick band passed over a 0.750 inch diameter roll will continuously cut material for over one working week.

The bands are also relatively inexpensive and, as may be seen from the fact that the base pivots open, may be easily installed.

It has been determined that if the band is formed by joining the ends thereof at an angle of 25°–65°, and preferably at 45°, by an electron beam process that the blades will have a much greater life.

It should be pointed out that the roller arrangement yields an air space just below the drive roller 62. The distance between the downward and upward portions of the band provide an air space of about 0.002 inch. This provides for a cutting surface of less than 0.01 inch, taking into consideration the thickness of the band going up and down and the air space there-between.

Operation of the cutting device

In operation, the leading wedge 4 is first opened relative to the trailing wedge 6 to expose rollers 106–112. The blade 12 is inserted over drive roller 62 and between tension roller 66 and grinder 80. It is subsequently positioned between the two idler rollers 92 and 94 and in groove 10 of support 8. Since the tension on the various rollers 78, 92 and 94, as well as grinder 80, is quite slack, it will be easy to position the band 12 around the bottom rollers 106–112. The tension on the rollers 78 and 94 is adjusted, as is the tension on the grinder 80 by means of the respective thumb screws. Upon actuation of the motor, the belt 54 will transmit the driving torque to the drive roller 62 via pulley 56.

To perfect an initial sharpening of the band 12 the grinder 80 is moved inwardly. It is then moved outwardly to a position where it will provide a fine, continuous hone on the blade.

Prior to operation, it is advisable to place the front and rear covers 20 and 22 respectively, on the device by means of thumb screws 24 and 26.

Of course, prior to cutting, the two wedge plates 4 and 6 will be closed relative to each other and the cloth will be positioned adjacent the blade 12 with the presser foot 32 exerting a pressure in the conventional manner on the cloth or other material to be cut.

Since the device is designed to weigh 15 pounds or less, it can be carried by the handle of the drill motor 16 and the base 2 and positioned relative to the cloth being cut.

Figure 7:
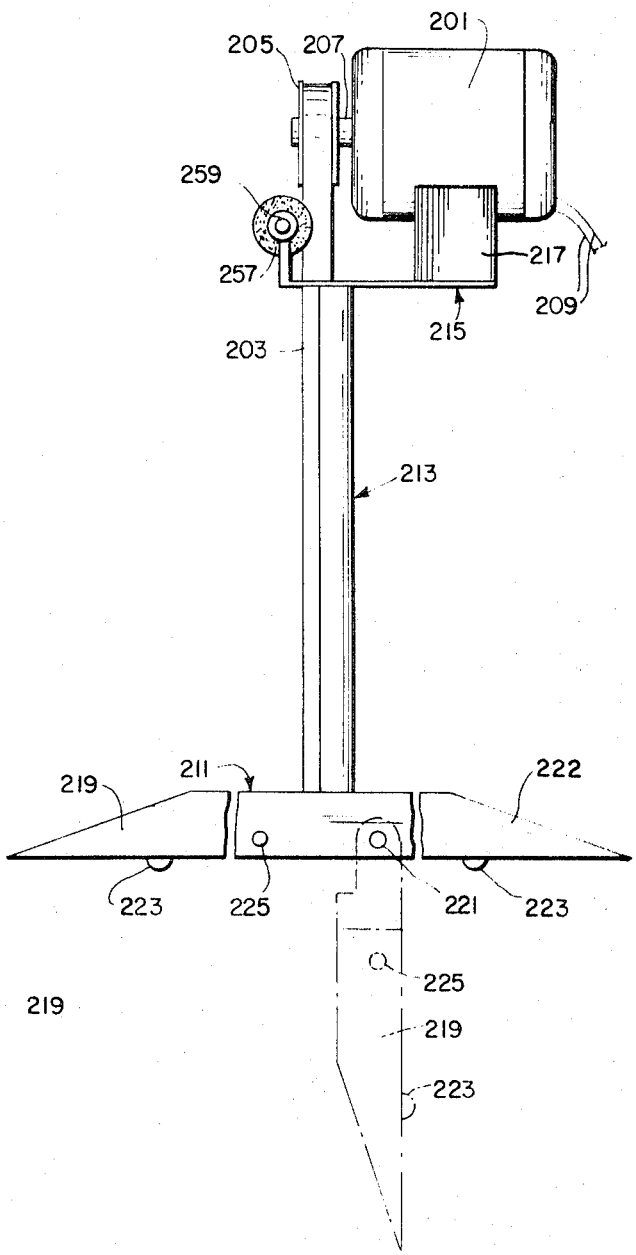
FIG. 7 is a side elevation view of the invention seen in FIG. 6.

Detailed description of the embodiment of FIGS. 6 and 7

Referring now to FIGS. 6 and 7, an electric drive motor is seen at 201 for driving an endless band blade 203. The motor 201 may also be any small portable motor, for example, a standard drill motor having a friction pulley 205 in lieu of the drill chuck. The pulley 205 is connected to the motor by means of a drive shaft 207. A pair of electric conductors 209 are seen in FIG. 7 connected to the motor 201 to provide power therefor. As in the above embodiment DC power may be used.

The motor 201 is supported on a wedge-shaped base seen generally at 211, a support bar 213 and a platform 215. The platform 215 has a conventional-type motor bracket holder 217 thereon. The support bracket 215 will obviously vary in shape and construction with the particular type and configuration of the motor 201.

The base plate 211 has a leading wedge 219 which is hinged on pivot means 221. The base further has a trailing wedge 222. A plurality of wheels or casters 223 are seen on both the leading and trailing wedges. The wedge 219 is releasably locked in position by means of a pin 225 which is removably inserted when it is desired to raise or lower wedge 219.

The pulley 205 will rotate in, for example, a clockwise direction as indicated by arrow 227. The band 203 will move downwardly as indicated by arrow 229, around a first fixed guide roll 231, a first return roll 233, a second return roll 235 and a second fixed guide roll 237. It will move upwardly as indicated by arrow 239. The band 203 will then pass over a tension roll 241, and then continue around the pulley 205.

The tension roll 241 may be moved inwardly and outwardly by means of adjusting element 243. The adjusting element has a support 245 movable in a manner similar to elements 66–79 discussed above. It includes a thumb screw 247 for moving the roll 241.

A sharpening disc is seen at 255. This may be a power driven disc grinder as discussed in regard to the previous modification, or as illustrated in FIGS. 6 and 7, includes a bar of carbide 257 which is permanently set at a 3° angle and may be moved inwardly by a thumb-pressure action on button 259.

The operation of the instant embodiment is similar to that discussed above.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

I claim:

1. An endless band cutter comprising:
   (a) a base,
   (b) a support on said base,
   (c) a mounting bracket connected to said support,
   (d) a set of base rollers on said base,
   (e) a tension roller on said mounting bracket,
   (f) a drive roller,
   (g) an endless band blade positioned around said drive roller and said base rollers and over said tension roller,
   (h) means for driving said drive roller positioned on said mounting bracket,
   (i) means for continuously sharpening said blade positioned on said mounting bracket, including positive driving means for continuously rotating said sharpening means,
   (j) means for adjusting the tension of said tension roller, and
   (k) means for adjusting the location of said sharpening means substantially transverse to said blade whereby the tension applied to said blade is varied in relation to the degree of sharpening desired.

2. An endless band cutter as defined in claim 1 wherein said base has a leading portion and a trailing portion, said portions being pivotally connected to each other.

3. An endless band cutter comprising:
   (a) a base having a leading portion and a trailing portion, said portions pivotally connected to each other and being pivotally movable relative to each other in the same plane,
   (b) a support on said base,
   (c) a mounting bracket connected to said support,
   (d) a set of base rollers on said base,
   (e) a tension roller on said mounting bracket,
   (f) a drive roller,
   (g) an endless band blade positioned around said drive roller and said base rollers and over said tension roller,
   (h) means for driving said drive roller positioned on said mounting bracket,
   (i) means for continuously sharpening said blade positioned on said mounting bracket,
   (j) means for adjusting the tension of said tension roller, and
   (k) means for adjusting the location of said sharpening means.

4. An endless band cutter as defined in claim 2 wherein one of said portions pivots downwardly relative to the other of said portion.

5. An endless band cutter as defined in claim 1 wherein said base rollers include a pair of return rollers positioned remote from said support and a pair of guide rollers adjacent said support.

6. An endless band cutter as defined in claim 1 wherein at least one of said rollers includes a back flange on the rear side thereof whereby the backward movement of the band blade will be restricted under a thrust load.

7. An endless band cutter comprising:
   (a) a base,
   (b) a support on said base,
   (c) a mounting bracket connected to said support,
   (d) a set of base rollers on said base,
   (e) a tension roller on said mounting bracket,
   (f) a drive roller,
   (g) an endless band blade positioned around said drive roller and said base rollers and over said tension roller,
   (h) a direct current electric motor means for driving said drive roller positioned on said mounting bracket,
   (i) means for sharpening said blade positioned on said mounting bracket,
   (j) means for adjusting the tension of said tension roller, and
   (k) means for adjusting the location of said sharpening means.

8. An endless band cutter as defined in claim 1 including a front cover removably secured to said mounting bracket, said front cover including a channel portion thereon, a presser foot, said presser foot having a shaft attached thereto, said shaft being slideably positioned in said channel.

9. An endless band cutter as defined in claim 1 wherein said support has groove means therein for receiving both downward and upward moving portions of said band blade.

10. An endless band cutter comprising:
    (a) a base,
    (b) a support on said base having a groove means therein,
    (c) a mounting bracket connected to said support,
    (d) a set of base rollers on said base,
    (e) a tension roller on said mounting bracket,
    (f) a drive roller,
    (g) an endless band blade positioned around said drive roller and said base rollers and over said tension roller,
    (h) means for driving said drive roller positioned on said mounting bracket,
    (i) means for sharpening said blade positioned on said mounting bracket,
    (j) means for adjusting the tension of said tension roller,
    (k) means for adjusting the location of sharpening means, and
    (l) said groove means receiving both downward and upward moving portions of said band blade having an overall cutting width of approximately 0.01 inch.

11. An endless band cutter comprising:
    (a) a base,
    (b) a support on said base,
    (c) a mounting bracket connected to said support,
    (d) a set of base rollers on said base,
    (e) a tension roller on said mounting bracket,
    (f) a drive roller,
    (g) an endless band blade positioned around said drive roller and said base rollers and over said tension roller,
    (h) means for driving said drive roller positioned on said mounting bracket,
    (i) means for sharpening said blade positioned on said mounting bracket and being continuously rotated by said driving means, (j) means for adjusting the tension of said tension roller, and
(k) means for adjusting the location of said sharpening means.

12. An endless band cutter comprising:
(a) a base,
(b) a support on said base,
(c) a mounting bracket connected to said support,
(d) a set of base rollers on said base,
(e) a tension roller on said mounting bracket,
(f) a drive roller,
(g) an endless band blade positioned around said drive roller and said base rollers and over said tension roller,
(h) means for driving said drive roller positioned on said mounting bracket,
(i) means for sharpening said blade positioned on said mounting bracket,
(j) means for adjusting the tension of said tension roller, and
(k) means for adjusting the location of said sharpening means,
(l) said tension roller and said sharpening means being mounted substantially opposite each other on said bracket.

13. An endless band cutter as defined in claim 1 including a pair of idler rollers mounted on said bracket below said sharpening means and tension roller.

14. An endless band cutter as defined in claim 13 including means for adjusting of said idler rollers.

References Cited

UNITED STATES PATENTS

| | | | |
|---|---|---|---|
| 703,784 | 7/1902 | Grosheim | 30—274 |
| 892,460 | 7/1908 | Spielman | 30—274 |
| 1,666,271 | 5/1928 | Spielman | 30—274 |
| 2,295,654 | 9/1942 | Gury | 30—139 |
| 2,346,046 | 4/1944 | Ogden | 30—274 |
| 369,466 | 9/1887 | Parshall | 30—274 |
| 1,445,325 | 2/1923 | Kirn | 30—274 |
| 1,125,434 | 1/1915 | Arendt | 30—264 X |

ROBERT C. RIORDON, Primary Examiner

J. C. PETERS, Assistant Examiner

U.S. Cl. X.R.

30—274